(12) United States Patent
Watanabe

(10) Patent No.: US 7,873,659 B2
(45) Date of Patent: Jan. 18, 2011

(54) DATABASE MANAGEMENT SYSTEM, DATABASE MANAGEMENT METHOD AND DATABASE MANAGEMENT PROGRAM

(75) Inventor: Kenji Watanabe, Tokyo (JP)

(73) Assignee: Mizuho Information & Research Institute, Inc. (JP)

( * ) Notice: Subject to any disclaimer, the term of this patent is extended or adjusted under 35 U.S.C. 154(b) by 411 days.

(21) Appl. No.: 12/045,239

(22) Filed: Mar. 10, 2008

(65) Prior Publication Data

US 2009/0112851 A1    Apr. 30, 2009

(30) Foreign Application Priority Data

Oct. 31, 2007    (JP)    ............... 2007-283342

(51) Int. Cl.
*G06F 17/30*    (2006.01)
(52) U.S. Cl. ............ 707/778; 707/755; 707/796; 707/E17.005
(58) Field of Classification Search .......... 707/999.005, 707/5, E17.005, 777, 778, 755, 756, 796
See application file for complete search history.

(56) References Cited

U.S. PATENT DOCUMENTS

| | | | | |
|---|---|---|---|---|
| 5,361,349 A | * | 11/1994 | Sugita et al. | 1/1 |
| 5,604,861 A | * | 2/1997 | Douglas et al. | 715/776 |
| 5,628,009 A | * | 5/1997 | Kikuta et al. | 1/1 |
| 6,199,059 B1 | * | 3/2001 | Dahan et al. | 1/1 |
| 6,941,309 B2 | | 9/2005 | Mitomi et al. | |
| 2004/0254950 A1 | * | 12/2004 | Musgrove et al. | 707/102 |
| 2007/0118542 A1 | * | 5/2007 | Sweeney | 707/100 |
| 2007/0244694 A1 | | 10/2007 | Hosokawa | |

FOREIGN PATENT DOCUMENTS

| JP | 10-091503 A | 4/1998 |
|---|---|---|
| JP | 2002-182970 | 6/2002 |
| JP | 2004-102792 | 4/2004 |
| JP | 2007-265031 | 10/2007 |

OTHER PUBLICATIONS

Office Action issued in a counterpart foreign application on Jun. 16, 2009.
Office Action issued in a counterpart foreign application on Sep. 15, 2009.

* cited by examiner

*Primary Examiner*—Tim T. Vo
*Assistant Examiner*—Shiow-Jy Fan
(74) *Attorney, Agent, or Firm*—Caesar, Rivise, Bernstein, Cohen & Pokotilow, Ltd.

(57) ABSTRACT

A meta-information storing section records a plurality of pieces of taxonomy data in ranks. A plurality of pieces of leaf meta-data respectively correspond to pieces of the lowest taxonomy data. A database records a plurality of pieces of real data which respectively correspond to pieces of leaf meta-data. A server control section searches for upper taxonomy data corresponding to the keyword included in a search request and acquires lower taxonomy data associated with the upper taxonomy data. The server control section is capable of repeatedly acquiring further lower taxonomy data until the lowest taxonomy data is specified, and as a result, acquiring leaf meta-data. The server control section samples real data corresponding to all of the leaf meta-data from the database and outputs it.

3 Claims, 5 Drawing Sheets

DATABASE MANAGEMENT SYSTEM, DATABASE MANAGEMENT METHOD AND DATABASE MANAGEMENT PROGRAM

BACKGROUND OF THE INVENTION

The present invention relates to a database management system for searching a database (DB), a database management method and a database management program.

Relational databases can store a large amount of various data, as that in data warehouses. Each piece of data included in a relational database is handled on the basis of a concept referred to as relationship model. Each piece of data is provided in a column and a record (row), and thus placed in each table and organized. Data can be reorganized on the basis of the respective columns and records, so that the operation of sampling data can be made easy. The system for operating/managing a relational database is referred to as relational database management system (RDBMS).

In the case where data is sampled from a relational database, it is necessary to specify the location where the data is stored and the specification of the data by referring to the program specification of the database. In the case where only the column of a specific data type is referred to in a table recorded in a database, for example, SQL sentences designated by the column are programmed using the data type of the column described in the specification, and thus, data is searched. In this case, it is necessary to specify the data the user desires to refer to by directly designating the name of the column or using the view function of the database at the time of programming.

In the case where the name of the column is directly designated, it is necessary to designate a plurality of columns using SQL sentences, which is troublesome. In addition, in the case where a column is added, for example, it is necessary to modify the SQL sentences, and therefore, flexible measures cannot be taken.

Likewise, in the case where the data the user desires to refer to is specified using the view function of the database, it is necessary to prepare a view for each unit of a plurality of data types, and therefore, the preparation is an energy-consuming task and preparation of a search formula takes time and effort, and thus, data cannot be searched smoothly.

In order to make searching of such a database more convenient, a technology using meta-data, which is conceptual information, is discussed in Japanese Laid-Open Patent Publication No. 10-91503. According to the technology in the above described publication, basic management information is registered in an information source management dictionary in advance, in order to collect information on the database system connected to the network. The information source management dictionary manages meta-information on the entirety of the database system. An information source management control system collects meta-information from meta-information on individual database systems and individual information source tools in accordance with timing designated by basic information for collecting information. The information source management control system reflects the collected meta-information in the information source management dictionary.

Many pieces of data can be stored in a data warehouse, in various formats. Therefore, it is difficult to search a plurality of databases having different structures and data names collectively and in a crossover manner in a data warehouse. In the case where the cause and effect relationship of data is examined, for example through data mining, specific types of data cannot be sampled irrespectively of the column name, and therefore, the efficiency of operation lowers.

In addition, in the case where data stored in each table of a relational database is classified, it is necessary to prepare different tables or manage the tables by providing attribute columns as the columns of the tables.

In the technology of the above described publication, the amount of meta-information for classification increases, and it is necessary to prepare complex SQL sentences in the case of classification in a plurality of dimensions. Furthermore, it is difficult to flexibly change the attributes for classification.

SUMMARY OF THE INVENTION

An objective of the present invention is to provide a database management system, a database management method, and a database management program, which allow efficient search for data.

According to one aspect of the present invention, a database management system is provided. The system is provided with a meta-information storing section for recording a plurality of pieces of taxonomy data in ranks. The plurality of pieces of taxonomy data include a plurality of pieces of upper taxonomy data and a plurality of pieces of lower taxonomy data which are associated with each piece of upper taxonomy data. Taxonomy data in the lowest rank is referred to as lowest taxonomy data. A plurality of pieces of leaf meta-data respectively correspond to pieces of the lowest taxonomy data. The database records a plurality of pieces of real data which respectively correspond to pieces of leaf meta-data. The control section searches the real data. The control section is provided with a search request acquiring section for acquiring a search request which includes a keyword. A taxonomy searching section searches upper taxonomy data which corresponds to the keyword using the meta-information storing section. The taxonomy searching section acquires lower taxonomy data associated with upper taxonomy data corresponding to the keyword in the case where the upper taxonomy data is registered in the meta-information storing section. It is possible for the taxonomy searching section to repeatedly acquire further lower taxonomy data until the lowest taxonomy data is specified. As a result, the taxonomy searching section acquires leaf meta-data. A search result outputting section samples real data corresponding to all of the leaf meta-data from the database, and then outputs it.

In addition, according to another aspect of the present invention, a method for managing a database using a database management system is provided. The system is provided with a meta-information storing section and a control section. The method is provided with recording of a plurality of pieces of taxonomy data in a meta-information storing section in ranks. The plurality of pieces of taxonomy data include a plurality of pieces of upper taxonomy data and a plurality of pieces of lower taxonomy data which are respectively associated with pieces of upper taxonomy data. The taxonomy data in the lowest rank is referred to as lowest taxonomy data. A plurality of pieces of leaf meta-data respectively correspond to pieces of lowest taxonomy data. The method is further provided with recording of a plurality of pieces of real data which respectively correspond to pieces of leaf meta-data in a database; and searching of real data using the control section. The method is further provided with acquiring of a search request which includes a keyword using the control section; searching of upper taxonomy data corresponding to the keyword using the meta-information storing section; acquiring of lower taxonomy data which can be associated with upper taxonomy data corresponding to the keyword in the case where the upper taxonomy data is registered in the meta-information storing section, wherein it is possible to repeatedly acquire further lower taxonomy data until the lowest taxonomy data is specified; acquiring of leaf meta-data from the lowest taxonomy data; and sampling of real data corresponding to all of the leaf meta-data from the database and outputting it.

In addition, according to still another aspect of the present invention, a program for managing a database using a database management system is provided. The system is provided with a meta-information storing section for recording a plurality of pieces of taxonomy data in ranks. The plurality of pieces of taxonomy data include a plurality of pieces of upper taxonomy data and a plurality of pieces of lower taxonomy data which are respectively associated with pieces of upper taxonomy data. The taxonomy data in the lowest rank is referred to as lowest taxonomy data. A plurality of pieces of leaf meta-data respectively correspond to pieces of lowest taxonomy data. The database records a plurality of pieces of real data which respectively correspond to pieces of leaf meta-data. The system is provided with a control section for searching for real data. The program makes it so that the control section has a function of carrying out a procedure for acquiring a search request which includes a keyword; a procedure for searching for upper taxonomy data corresponding to the keyword using the meta-information storing section; a procedure for acquiring lower taxonomy data which can be associated with upper taxonomy data in the case where upper taxonomy data corresponding to the keyword is registered in the meta-information storing section, wherein it is possible to repeatedly acquire further lower taxonomy data until the lowest taxonomy data is specified; a procedure for acquiring leaf meta data from the lowest taxonomy data; and a procedure for sampling real data corresponding to all of the leaf meta-data from the database and outputting it.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

FIGS. 1 to 6 show the database management system, database management method, and database management program according to one embodiment of the present invention. According to the present embodiment, the database management system, database management method, and database management program are used when the relational database for management data is searched.

Figure 1:
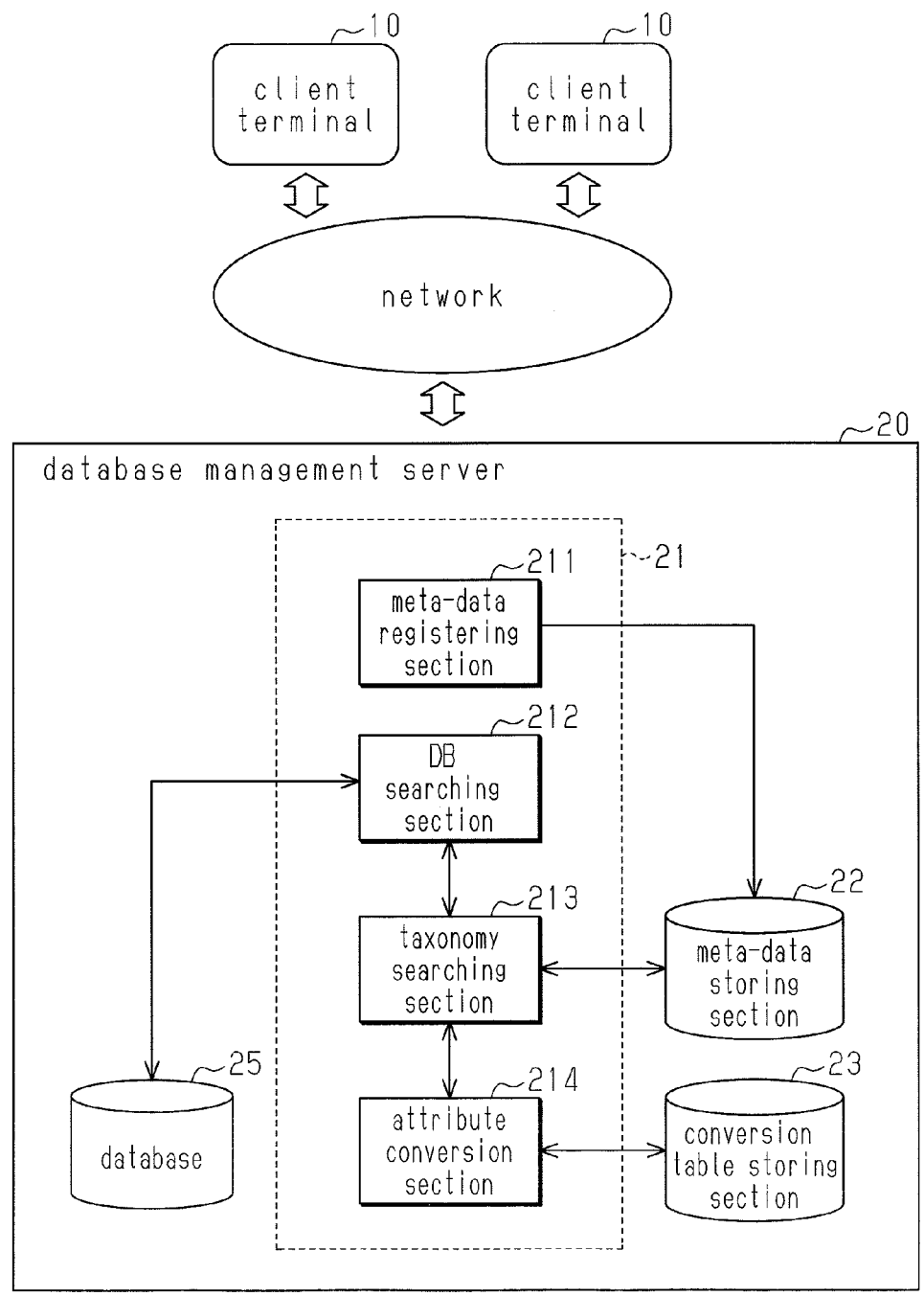
FIG. 1 is a block diagram showing a database management system according to one embodiment of the present invention.

As shown in FIG. 1, a plurality of client terminals 10 are respectively connected to a database management server 20 via a network. The database management system includes a database management server 20.

Each of the client terminals 10 is a computer terminal used by a user to search the database 25. The client terminals 10 are provided with a control section, a memory section, a communication section, a display section, and an input section. The control section includes a CPU, a RAM and a ROM. The storing section includes an HDD, the display section includes a display, and the input section includes a keyboard and a pointing device.

The database management server 20 is a computer server for managing the database 25. The database management server 20 is provided with a server control section 21, which is a control section. The server control section 21 includes a CPU, a RAM and a ROM. The server control section 21 carries out a classification and registering stage process, a DB search stage process, a taxonomy search stage process, and an attribute conversion stage process. The server control section 21 runs the database management program, and thus, functions as a meta-data registering section 211, a DB searching section 212, a taxonomy searching section 213, and an attribute conversion section 214. The database management server 20 receives classification data and DB column specifying data 222 from the client terminals 10. The DB column specifying data 222 specifies the column of real data RD.

The meta-data registering section 211 registers a plurality of pieces of taxonomy data 221, which are classification attributes, and a parent-child relationship with these pieces of taxonomy data 221 in the meta-data storing section 22 on the basis of data received from the client terminals 10. The meta-data registering section 211 registers DB column specifying data 222 and additional attributes AA in the meta-data storing section 22 in such a manner that they are associated with the taxonomy data 221.

The DB searching section 212 functions as a search request acquiring section or a search result outputting section. The DB searching section 212 searches the database 25 in accordance with a search request SR from a client terminal and outputs the search results to the client terminal 10.

The taxonomy searching section 213 specifies the classification using taxonomy data 221 in response to the request from the client terminal 10.

The attribute conversion section 214 acquires an attribute conversion coefficient CC using additional attributes AA which are associated with the taxonomy data 221. The attribute conversion coefficient CC is used to convert the attributes of real data RD.

The database management server 20 is provided with a meta-data storing section 22, a conversion table storing section 23, and a database 25.

Figure 2:
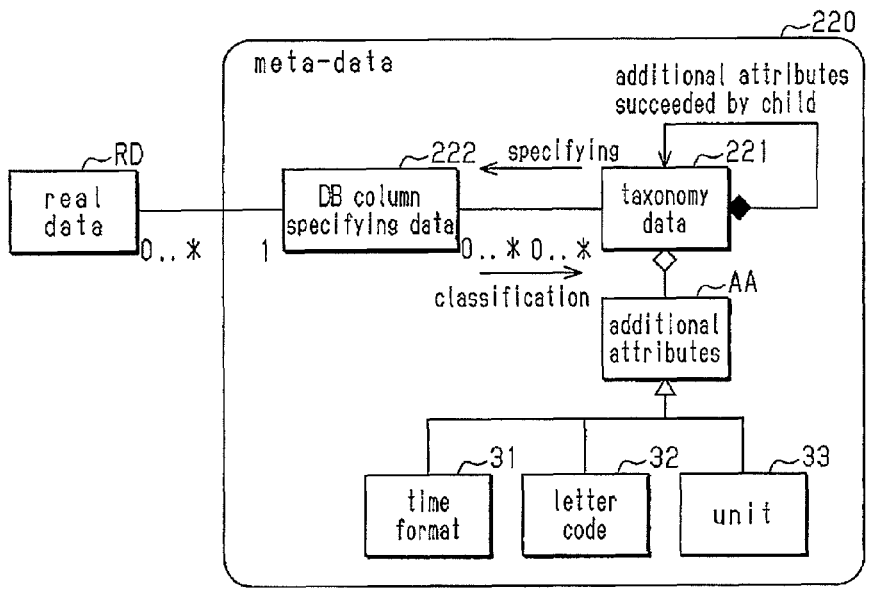
FIG. 2 is a block diagram showing meta-data recorded in the meta-data storing section shown in FIG. 1.

The meta-data storing section 22 which is a meta-information storing section records the meta-data 220 shown in FIG. 2. The meta-data 220 is used in the case where the database 25 is searched using taxonomy. The meta-data registering section 211 registers the meta-data 220 in the meta-data storing section 22. The meta-data 220 includes taxonomy data 221 and DB column specifying data 222.

Figure 3:
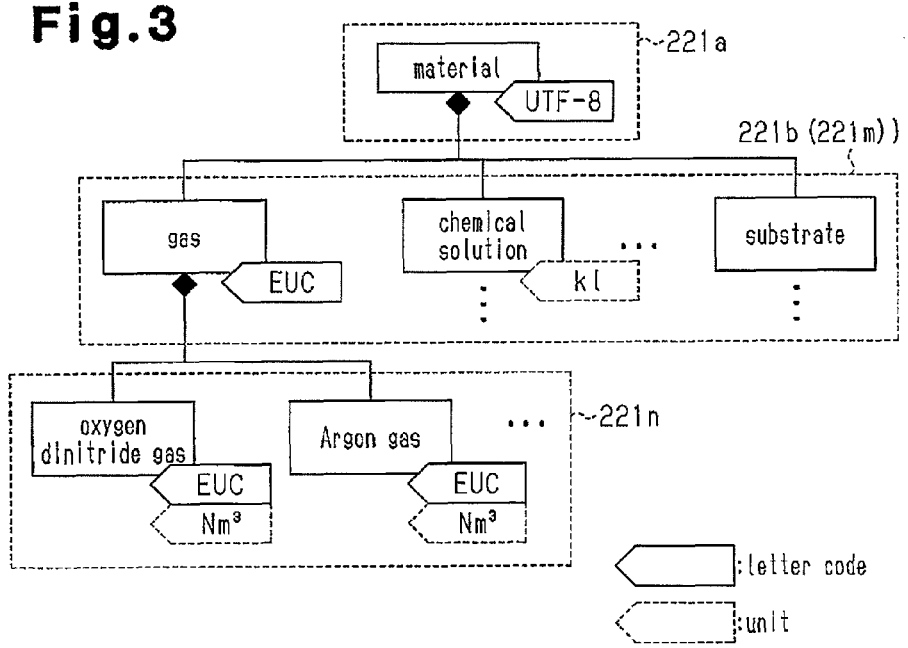
FIG. 3 is a block diagram showing the rank structure and additional attributes of the taxonomy data shown in FIG. 2.

The taxonomy data 221 is data for classifying the contents of real data RD. According to the present embodiment, the taxonomy data 221 is formed of a plurality of ranks, from upper class to lower class. As shown in FIG. 3, the ranks of taxonomy data 221, that is to say, the parent-child relationship, include upper taxonomy data 221a, which is upper class, and a plurality of pieces of lower taxonomy data 221b which are associated with upper taxonomy data 221a. Leaf metadata 221n is associated with the lowest taxonomy data 221m, which is the lowest class located in the lowest rank in the ranks of taxonomy data 221. As shown in FIG. 3, for example, "gas," "chemical solution" and "substrate," which are a plurality of pieces of lower taxonomy data 221b, are associated with "material," which is upper taxonomy data 221a. In the case of FIG. 3, the number of ranks of taxonomy data 221 is two, and the lower taxonomy data 221b is the lowest taxonomy data 221m. "Oxygen dinitride gas" and "argon gas," which are leaf meta-data 221n, are associated with "gas," which is one of the lowest taxonomy data 221m.

A data field which can record data and associate it with data relating to additional attributes AA is provided in each piece of taxonomy data 221. In the present embodiment, a "time format" field 31, a "letter code" field 32 and a "unit" field 33 are provided relating to additional attributes AA. Data for specifying the data format for year, month, date, and time, as well as time zone, is recorded in the "time format" field 31. Letters and data indicating a code system representing the relationship with the bite expression allocated to each letter such as "EUC," "JIS," "ASCII" and "UNICODE," are recorded in the "letter code" field 32. Data for specifying the "unit" of real data RD, for example kiloliters (kl) and cubic meters ($Nm^3$), is recorded in the "unit" field 33.

The additional attributes AA, which are associated with the upper taxonomy data 221a, are succeeded by the lower taxonomy data 221b. In the case of FIG. 3, additional attributes AA relating to the letter code are not recorded in "chemical solution," which is one piece of lower taxonomy data 221b. In this case, additional attributes "UTF-8" relating to the letter code of the upper taxonomy data 221a are succeeded by "chemical solution."

The DB column specifying data 222 records leaf meta-data 221n which is associated with the lowest taxonomy data 221m. The DB column specifying data 222 includes data which corresponds to each piece of leaf meta-data 221n and specifies the column where real data RD is stored in the database 25, that is to say, data relating to the column identifier.

The conversion table storing section 23, which is the conversion information storing section shown in FIG. 1, records, a conversion table for conversion additional attributes AA used for real data RD, for example "unit" attributes, into other attributes. That is to say, the conversion table records data relating to the attribute conversion coefficient CC in order to convert arbitrary attributes into other attributes.

The database 25 is a relational database for recording tables including a plurality of columns. The database 25 in the present embodiment records real data RD corresponding to leaf meta-data 221n for each column specified by a column identifier, for example chronological data.

Figure 4:
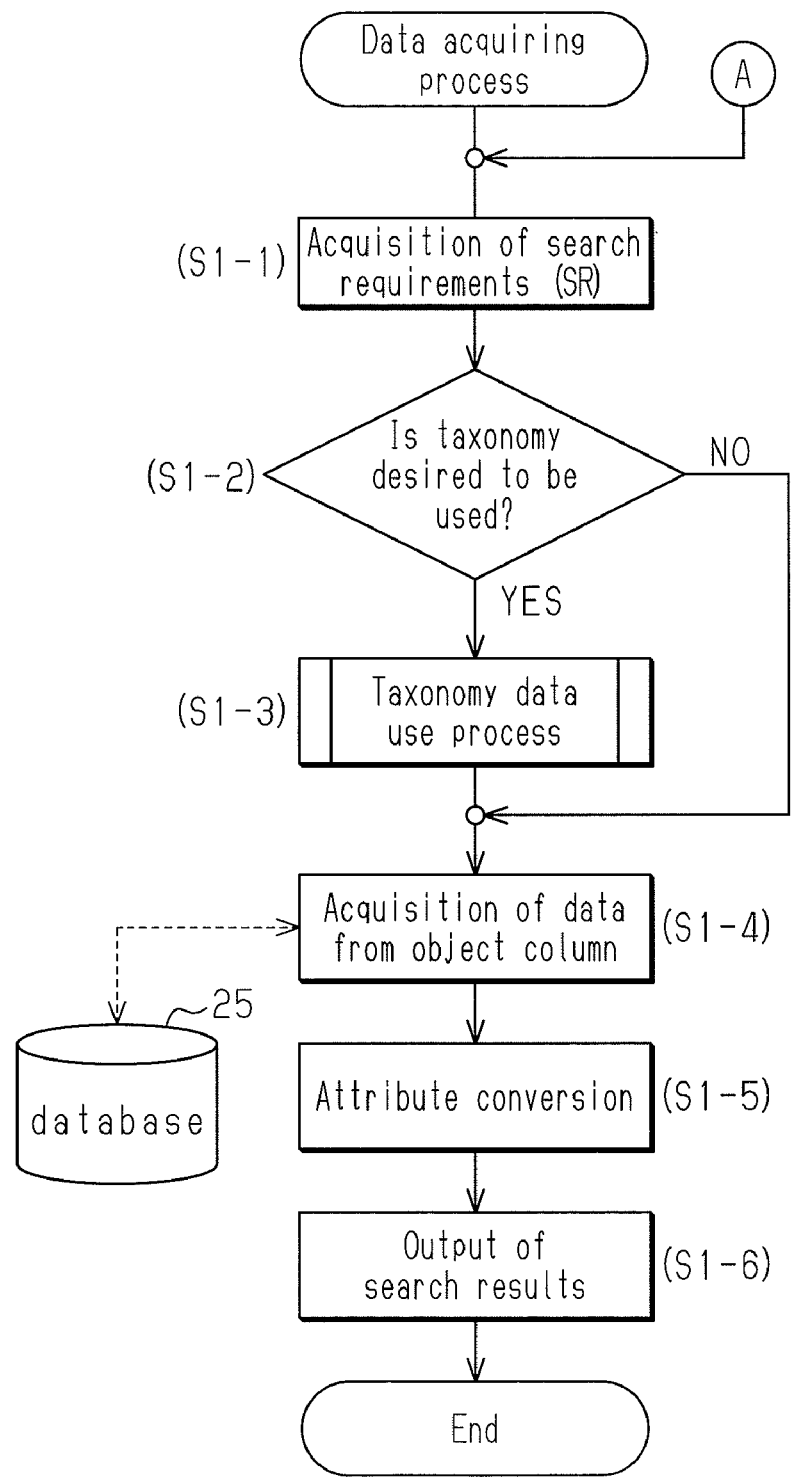
FIG. 4 is a flowchart showing a process procedure in the system of FIG. 1.
Figure 5:
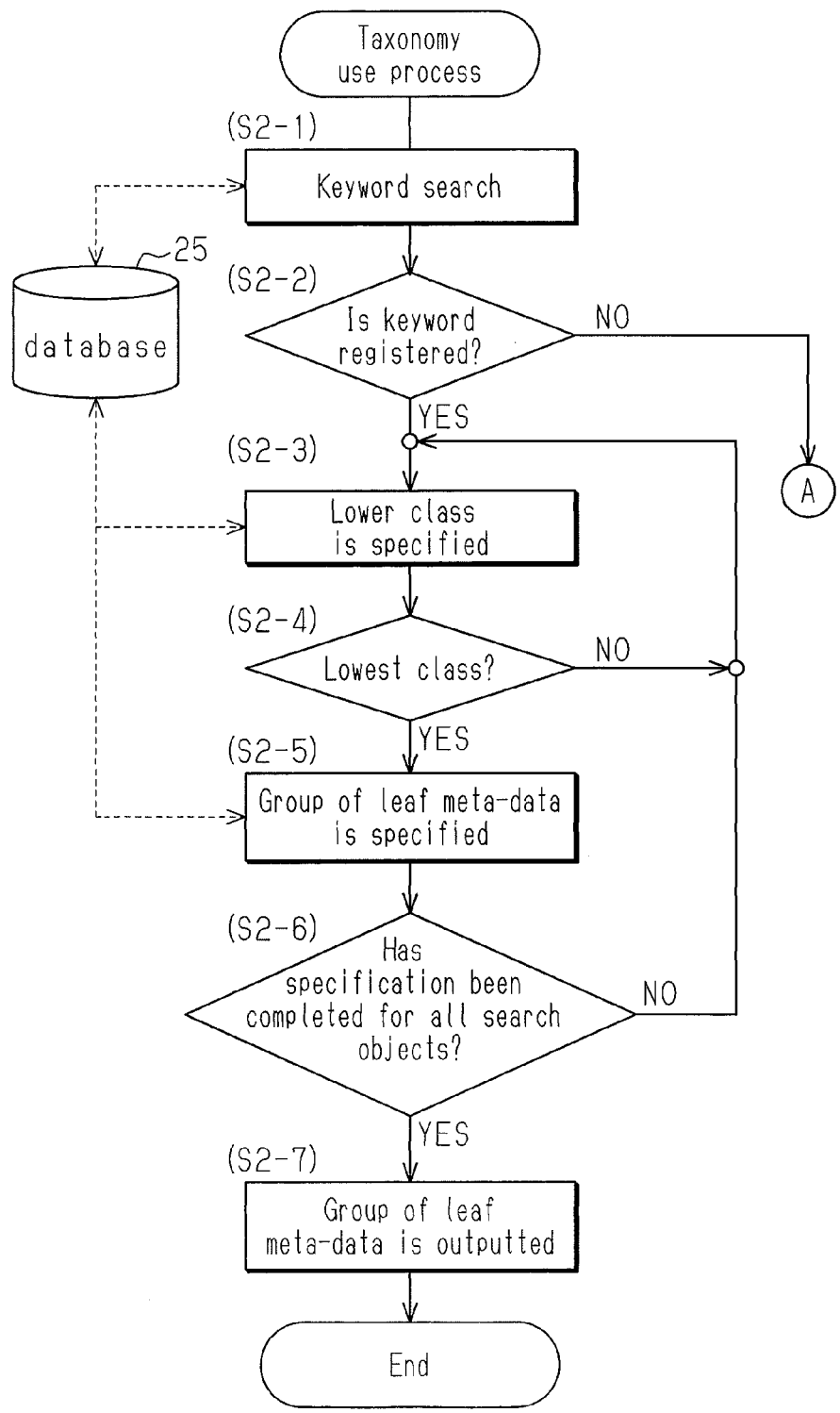
FIG. 5 is a flowchart showing the process procedure in the system of FIG. 1.
Figure 6:
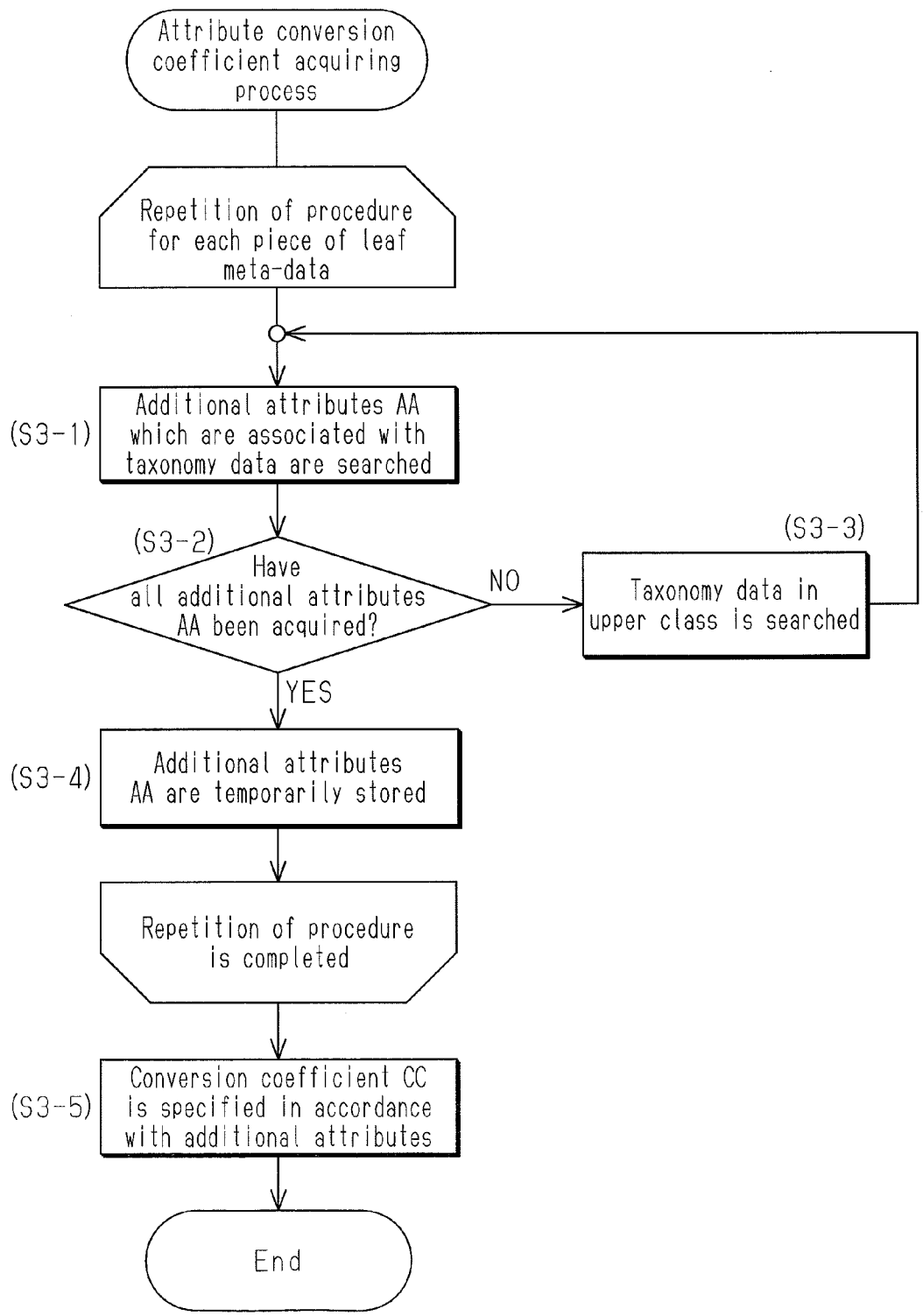
FIG. 6 is a flowchart showing the process procedure in the system of FIG. 1.

The flowcharts of FIGS. 4 to 6 show the procedure of a process in the case where the database 25 is searched using the database management system of FIG. 1, that is to say, the database searching process. The database searching process is made up of a taxonomy registering process (not shown), the data acquiring process shown in FIG. 4, the taxonomy using process shown in FIG. 5, and the attribute conversion coefficient acquiring process shown in FIG. 6.

(Taxonomy Registering Process)

In the taxonomy registering process, the user registers a taxonomy in the database management server 20 using a client terminal 10. The user accesses the database management server 20 from the client terminal 10.

The client terminal 10 acquires a menu screen from the database management server 20. The menu screen includes a taxonomy registration requesting function and a search requirement setting function. The taxonomy registration requesting function requests that the user register and edit classification of taxonomy data 221. The search requirement setting function requests that the user search the database. In the case where the user selects the taxonomy registration requesting function in the client terminal 10, the client terminal 10 transmits a class registration/editing request to the database management server 20.

In this case, the meta-data registering section 211 acquires meta-data 220 from the meta-data storing section 22 and generates class editing screen data for displaying a list of the taxonomy data 221 on the client terminal 10. Data on additional attributes AA and DB column specifying data 222 are associated with each class. The meta-data registering section 211 transmits the class editing screen data to the client terminal 10.

The client terminal 10 outputs a class editing screen to a display. The user can prepare a new class, delete an existing class, change the relationship between respective classes, set new DB column specifying data 222, and delete and change existing DB column specifying data 222 on the class editing screen.

When the user completes editing on the class editing screen, the client terminal 10 transmits a meta-data registration request to the server control section 21. The meta-data registration request includes meta-data 220 that has been edited on the class editing screen.

The server control section 21 carries out a verification process on the meta-data 220. Specifically, the registering section 211 outputs an error in the case where the registered contents are incorrect, as in the case where the table or column designated by a client terminal 10 does not exist. In the case where nothing is incorrect, the meta-data registering section 211 registers the meta-data 220 in the meta-data storing section 22.

(Data Acquiring Process)

FIG. 4 shows steps S1-1 to S1-6, which make up a data acquiring process. In the present embodiment, a case where the user searches the database 25 using a client terminal 10 is described. The user accesses the database management server 20 from the client terminal 10.

In step S1-1, the server control section 21 carries out a search requirement acquiring process, that is to say, a search request acquiring process. Specifically, in the case where the user selects a search requirement setting function on the menu screen on the display of the client terminal 10, the client terminal 10 transmits a search requirement setting request to the database management server 20.

The DB searching section 212 that receives the search requirement request transmits search setting screen data to the client terminal 10. The client terminal 10 outputs the search setting screen on the display. The search setting screen includes a taxonomy use setting function and a search requirement setting function. The user sets keywords used for classification by using the search requirement setting function in the case where taxonomy is used. The user sets a column identifier, which is the object of searching, by using the search requirement setting function in the case where taxonomy is not used. When the user completes input into the respective setting columns, the client terminal 10 transmits the search request SR to the database management server 20. The search request SR includes each piece of data set on the search setting screen. Specifically, in the case where the user desires to use taxonomy, the search request SR includes a use taxonomy command. The search request SR further provides search requirements including data relating to the keyword and the column identifier inputted in the setting column.

When the server control section 21 receives the search request SR from the client terminal 10, the procedure progresses to step S1-2, and a determination process as to whether the user desires to use taxonomy is carried out. Specifically, the DB searching section 212 determines whether the search request SR includes a use taxonomy command.

In the case of YES in step S1-2, that is to say, in the case where the search request SR includes a use taxonomy command, the server control section 21 proceeds to step S1-3 and carries out the taxonomy data use process, and then, the procedure progresses to step S1-4.

In the case of NO in step S1-2, that is to say, in the case where the search request SR does not include a use taxonomy command, the procedure in the server control section 21 skips step S1-3 and progresses to step S1-4.

In step S1-4, the server control section 21 carries out a process for acquiring data from the object column. Specifically, the DB searching section 212 acquires real data RD from the column corresponding to the leaf meta-data 221$n$ specified in step S1-3, in the case where taxonomy is used. In the case where the taxonomy data 221 is not used, the DB searching section 212 acquires real data RD using the search object column set on the search setting screen of the client terminal 10.

Next, in step S1-5, the server control section 21 carries out an attribute conversion process. Specifically, the DB searching section 212 carries out the attribute conversion coefficient acquiring process shown in FIG. 6, and thus, acquires an attribute conversion coefficient CC from the attribute conversion section 214. The DB searching section 212 uses the attribute conversion coefficient CC and converts the attributes of the real data RD into a format that can be outputted. That is to say, the attributes of the real data RD acquired from the database 25 are converted to a format that can be outputted by the attribute conversion coefficient CC corresponding to the additional attributes AA that are associated with the taxonomy data 221.

Next, in step S1-6, the server control section 21 carries out a process for outputting the search results. Specifically, the DB searching section 212 provides real data RD of which the additional attributes AA are converted into a format that can be outputted to the client terminal 10.

(Taxonomy Use Process)

FIG. 5 shows steps S2-1 to S2-7, which make up a taxonomy use process.

In step S2-1, the server control section 21 carries out a keyword searching process. Specifically, the taxonomy searching section 213 searches the upper taxonomy data 221$a$ corresponding to the keyword included in the search request SR to see if it has already been registered in the meta-data storing section 22.

In the case of NO in step S2-2, that is to say, in the case where the meta-data storing section 22 has not registered the upper taxonomy data 221$a$ corresponding to the keyword included in the search request SR, the server control section 21 returns to the search request acquiring process in step S1-1 in FIG. 4.

In the case of YES in step S2-2, that is to say, in the case where the meta-data storing section 22 has already registered the upper taxonomy data 221$a$ corresponding to the keyword included in the search request SR, the server control section 21 proceeds to step S2-3 and carries out a process for specifying the lower taxonomy data 221$b$. Specifically, the taxonomy searching section 213 recognizes the taxonomy data 221 corresponding to the keyword included in the search request SR as the upper taxonomy data 221$a$, and acquires the lower taxonomy data 221$b$ associated with the upper taxonomy data 221$a$. In the case where a plurality of pieces of lower taxonomy data 221$b$ are associated with the upper taxonomy data 221$a$ corresponding to the keyword, the taxonomy searching section 213 acquires all of the lower taxonomy data 221$b$.

In step S2-4, the server control section 21 carries out a process for determining the rank of each piece of lower taxonomy data 221$b$. Specifically, the taxonomy searching section 213 determines whether further lower taxonomy data 221$c$ is associated with the acquired lower taxonomy data 221$b$. That is to say, the taxonomy searching section 213 determines whether the lower taxonomy data 221$b$ at that time is the lowest taxonomy data 221$m$.

In the case of NO in step S2-4, that is to say, in the case where it is determined that there is further lower taxonomy data 221$c$, the server control section 21 proceeds to step S2-3 and carries out a process for specifying further lower taxonomy data 221$c$. In this manner, steps S2-3 and S2-4 are repeated until the taxonomy searching section 213 reaches the lowest taxonomy data 221$m$.

In the case of YES in step S2-4, that is to say, in the case where it is determined that there is no further lower taxonomy data 221$c$, the server control section 21 proceeds to step S2-5 and carries out a process for specifying a group of leaf meta-data 221$n$. Specifically, the taxonomy searching section 213 samples a plurality of pieces of leaf meta-data 221$n$ which are respectively associated with the all of the lowest taxonomy data 221$m$ from the meta-data storing section 22. The taxonomy searching section 213 temporarily stores the plurality of sampled pieces of leaf meta-data 221$n$ in the memory of the server control section 21 as one group.

Next, in step S2-6, the server control section 21 carries out a process for determining whether specification has been completed for all search objects. Specifically, the taxonomy searching section 213 determines whether all of the leaf meta-data 221$n$ relating to the keyword included in the search request SR can be specified. In the case of NO in step S2-6, that is to say, in the case where taxonomy data 221 relating to unspecified leaf meta-data 221$n$ remains, the server control section 21 repeats the processes in step S2-3 onward.

In the case of YES in step S2-6, that is to say, in the case where specification has been completed for all of the leaf meta-data 221$n$, the server control section 21 proceeds to step S2-7 and carries out a process for outputting the group of leaf meta-data 221$n$. Specifically, the taxonomy searching section 213 supplies all of the leaf meta-data 221$n$ that is temporarily stored in the memory to the DB searching section 212.

(Process for Acquiring Attribute Conversion Coefficient CC)

FIG. 6 shows steps S3-1 to S3-5, which make up a process for acquiring an attribute conversion coefficient CC. The process for acquiring an attribute conversion coefficient CC is repeatedly carried out for each piece of leaf meta-data 221*n* that is specified through the taxonomy data use process in FIG. 5.

In step S3-1, the server control section 21 carries out a process for searching the additional attributes AA associated with the taxonomy data 221. Specifically, the attribute conversion section 214 acquires the additional attributes AA of the taxonomy data 221 that is associated with the leaf meta-data 221*n* from the meta-data storing section 22. In step S3-2 the server control section 21 determines whether all of the additional attributes AA corresponding to each piece of leaf meta-data 221*n* have been acquired.

In the case of NO in step S3-2, that is to say, in the case where there are some additional attributes AA which are not registered and associated with each piece of taxonomy data 221, namely in the case where there are some additional attributes AA that cannot be acquired, the server control section 21 carries out a process for searching the upper taxonomy data 221*a* in step S3-3. Specifically, the attribute conversion section 214 searches the upper taxonomy data 221*a*, which is associated with each piece of taxonomy data 221. Steps S3-1 to S3-3 are repeated until the attribute conversion section 214 detects the upper taxonomy data 221*a* which records the missing additional attributes AA.

In the case of YES in step S3-2, that is to say, in the case where all of the additional attributes AA are acquired, the server control section 21 proceeds to step S3-4 and temporarily stores the additional attributes AA. Specifically, the attribute conversion section 214 temporarily stores the additional attributes AA in the memory of the server control section 21 in such a manner that the additional attributes correspond to each piece of leaf meta-data 221*n*.

In the case where the additional attributes AA corresponding to all of the leaf meta-data 221*n* are acquired, the server control section 21 carries out a process for specifying the attribute conversion coefficient CC in accordance with the additional attributes AA in step S3-5. Specifically, the attribute conversion section 214 first determines the representative attributes RA. The attribute conversion section 214 in the present embodiment designates the additional attributes AA most often used from among a plurality of additional attributes AA that are temporarily stored as the representative attributes RA. The attribute conversion section 214 acquires respective attribute conversion coefficients CC between respective additional attributes AA associated with each piece of leaf meta-data 221*n* and representative attributes RA from the conversion table storing section 23. The attribute conversion section 214 supplies the respective attribute conversion coefficients CC to the DB searching section 212 in such a manner that they correspond to each piece of leaf meta-data 221*n*.

The present embodiment has the following advantages.

(1) The database management server 20 is provided with a meta-data storing section 22, and the meta-data storing section 22 records meta-data 220 used for searching the database 25. The meta-data 220 includes taxonomy data 221 and DB column specifying data 222. In the taxonomy data use process shown in FIG. 5, in the case of YES in step S2-2, that is to say, in the case where the meta-data storing section 22 registers the upper taxonomy data 221*a* corresponding to the keyword included in the search request SR, the server control section 21 proceeds to step S2-3 and carries out a process for specifying the lower taxonomy data 221*b*. The taxonomy searching section 213 repeats the process for searching further lower taxonomy data 221*c* until the lowest taxonomy data 221*m* is reached. The server control section 21 specifies the column where real data RD is recorded using the leaf meta-data 221*n* associated with the lowest taxonomy data 221*m*. Therefore, the user can acquire classified real data RD simply by inputting a keyword in the client terminal 10. Accordingly, the user can search the database 25 flexibly and efficiently, by designating the upper taxonomy data 221*a*. In addition, it is possible to set the classes of the taxonomy data 221 after the data is stored in the database management server 20, and thus, enormous amounts of data can be efficiently organized.

Therefore, it is not necessary for the user to designate the database 25 where real data RD is stored or the table name, and desired real data RD can be acquired by designating a keyword. In addition, in the case of new addition and modification of a column, real data RD can be acquired from the column corresponding to taxonomy data 221 when the taxonomy data 221 is modified. This is particularly effective in the case where the number of tables and the number of columns are great.

(2) Data relating to additional attributes AA is associated with each piece of taxonomy data 221 recorded in the meta-data storing section 22. Therefore, it is possible to omit setting of columns for additional attributes AA in the database 25, and thus, the amount of data can be reduced.

Furthermore, the conversion table storing section 23 records additional attributes AA used for real data RD, for example "unit" attributes, in a conversion tape for conversion to other attributes. In the case of NO in step S3-2 in FIG. 6, that is to say, in the case where there are some additional attributes AA which are not registered in association with the taxonomy data 221, and therefore there are some additional attributes AA which cannot be acquired as they are, the server control section 21 proceeds to step S3-3 and carries out a process for searching the upper taxonomy data 221*a*. Steps S3-1 to S3-3 are repeated until the attribute conversion section 214 detects the upper taxonomy data 221*a* which records the missing additional attributes AA. Therefore, the server control section 21 can specify additional attributes AA for real data RD using the additional attributes AA of the upper taxonomy data 221*a* in the meta-data storing section 22. Accordingly, additional attributes AA which are shared by the upper taxonomy data 221*a* and the lower taxonomy data 221*b* can be stored in the upper taxonomy data 221*a* so as to be succeeded by the lower taxonomy data 221*b*, and therefore, the capacity of the memory of the meta-data storing section 22 can be reduced.

Therefore, the server control section 21 can output real data RD using a common attribute among a plurality of types of real data RD, for example "unit" attributes, even in the case where these pieces of real data RD are acquired.

(3) In the case where the additional attributes AA corresponding to all of the leaf meta-data 221*n* are acquired, the server control section 21 proceeds to step S3-5 in FIG. 6, and carries out a process for specifying the attribute conversion coefficient CC in accordance with the additional attributes AA. Specifically, the attribute conversion section 214 designates representative attributes RA from among a plurality of additional attributes AA which are temporarily stored, and acquires the respective attribute conversion coefficients CC between the respective additional attributes AA which are associated with each piece of leaf meta-data 221*n* and the representative attributes RA from the conversion table storing section 23. Therefore, the server control section 21 can output real data RD using additional attributes AA shared by a plurality of pieces of leaf meta-data 221*n* in the group specified by the plurality of pieces of leaf meta-data 221*n*. In particular, the additional attributes AA used most often can be designated as the representative attributes RA, so that the number of pieces of real data RD whose attributes should be converted can be reduced, and therefore, the load for processing can be reduced.

The above described embodiment may be modified as follows.

The number of ranks of taxonomy data 221 is not limited to two as shown in FIG. 3, but may be three or greater. That is to say, classification of taxonomy data 221 is not limited to classification into upper taxonomy data 221a and lower taxonomy data 221b. In addition, it is possible for the meta-data storing section 22 to store taxonomy data 221 where a plurality of rank structures having different numbers of ranks between the highest class and the lowest class are mixed.

In the process for acquiring an attribute conversion coefficient CC, the method for determining the representative attributes RA is not limited to determining additional attributes AA that is the greatest in number to be representative attributes RA. For example, the attributes designated by the user using a client terminal 10 may be set as representative attributes RA. In this case, the server control section 21 converts each piece of real data RD using the representative attributes RA acquired from the client terminal 10 and each of the additional attributes AA. In this case, the attributes desired by the user can be set as representative attributes RA.

What is recorded in the database 25 is not limited to real data RD made up of a plurality of columns, and it is also possible to record a plurality of tables. In this case, the DB column specifying data 222 is data relating to a table identifier and a column identifier for specifying the location where real data RD for each piece of leaf meta-data 221n is stored in the database 25, that is to say, a table or column.

The invention claimed is:

1. A database management system, comprising:
a meta-information storing section for recording a plurality of pieces of taxonomy data in ranks, wherein the pieces of taxonomy data include a plurality of pieces of upper taxonomy data and a plurality of pieces of lower taxonomy data which are respectively associated with the pieces of upper taxonomy data, the taxonomy data in the lowest rank is referred to as lowest taxonomy data, and a plurality of pieces of leaf meta-data respectively correspond to each piece of the lowest taxonomy data;
a computer server provided with a control section and a database for recording a plurality of pieces of real data which respectively correspond to pieces of the leaf meta-data;
the control section being arranged for searching the real data,
wherein the control section includes:
a CPU, a RAM, and a ROM and executing a database management program, which when executed causes the control section to function as:
a search request acquiring section for acquiring a search request which includes a keyword;
a taxonomy searching section for searching upper taxonomy data corresponding to the keyword using the meta-information storing section, wherein, in the case where the upper taxonomy data corresponding to the keyword is registered in the meta-information storing section, the taxonomy searching section acquires lower taxonomy data which is associated with the upper taxonomy data, and the taxonomy searching section being capable of repeatedly acquiring further lower taxonomy data until the lowest taxonomy data is specified, and as a result, the taxonomy searching section acquires the leaf meta-data;
a search result outputting section for sampling the real data corresponding to all of the leaf meta data from the database and outputting the real data, and
a conversion information storing section for recording a conversion table used for converting each of a plurality of additional attributes into an output format,
wherein the meta-information storing section records each of the additional attributes in such a manner that the additional attributes are respectively associated with the taxonomy data,
wherein the control section determines the output format for the real data from the search request,
wherein the control section further includes an attribute conversion section for converting the additional attributes of the leaf meta-data into the output format using the conversion table and outputting the result to a client terminal, and
wherein, in the case where there are additional attributes which are not recorded in association with the leaf meta-data which is the object of output, the attribute conversion section specifies the upper taxonomy data from the leaf meta-data using the meta-information storing section and converts additional attributes which are associated with the upper taxonomy data into the output format.

2. A method for managing a database using a database management system, wherein the system comprises a meta-information storing section and a control section, the method comprising:
recording a plurality of pieces of taxonomy data in ranks in the meta-information storing section, wherein the pieces of taxonomy data include a plurality of pieces of upper taxonomy data and a plurality of pieces of lower taxonomy data which are respectively associated with the pieces of upper taxonomy data, the taxonomy data in the lowest rank is referred to as lowest taxonomy data, and a plurality of pieces of leaf meta-data respectively correspond to each piece of the lowest taxonomy data;
recording a plurality of pieces of real data respectively corresponding to each piece of the leaf meta data in the database;
creating a search request using a client terminal having a display in which the search request includes a keyword; and
executing a database management program on a computer server to function as the control section and searching the real data using the control section,
wherein, using the control section, the method further comprises:
acquiring the search request which includes the keyword via a network;
searching upper taxonomy data corresponding to the keyword using the meta-information storing section;
acquiring lower taxonomy data associated with upper taxonomy data corresponding to the keyword in the case where the upper taxonomy data is registered in the meta-information storing section, wherein it is possible to repeatedly acquire further lower taxonomy data until the lowest taxonomy data is specified;
acquiring the leaf meta-data from the lowest taxonomy data; and
sampling real data corresponding to all of the leaf meta-data from the database and outputting the real data;
wherein the method further includes;
recording a conversion table used for converting each of a plurality of additional attributes into an output format;

recording each of the additional attributes in such a manner that the additional attributes are respectively associated with the taxonomy data;

using the control section to determine the output format for the real data from the search request, and converting the additional attributes of the leaf meta-data with the control section into the output foimat using the conversion table and outputting the result to the client terminal via the network and displaying the result on the display of the client terminal, and in the case where there are additional attributes which are not recorded in association with the leaf meta-data which is the object of output, specifying the upper taxonomy data from the leaf meta-data using the meta-information storing section and converting additional attributes which are associated with the upper taxonomy data into the output format.

3. An article for use in a computer system, the article comprising computer readable media encoded with a program for managing a database using a database management system, wherein the computer system when executing the program performs functions comprising:

a meta-information storing section for recording a plurality of pieces of taxonomy data in ranks, wherein the pieces of taxonomy data include a plurality of pieces of upper taxonomy data and a plurality of pieces of lower taxonomy data which are respectively associated with the pieces of upper taxonomy data, the taxonomy data in the lowest rank is referred to as lowest taxonomy data, a plurality of pieces of leaf meta-data respectively correspond to each piece of the lowest taxonomy data, and the database records a plurality of pieces of real data respectively corresponding to pieces of the leaf meta-data; and a control section for searching the real data, wherein the program causes the control section to carry out:

a procedure for acquiring a search request which includes a keyword;

a procedure for searching upper taxonomy data corresponding to the keyword using the meta-information storing section;

a procedure for acquiring lower taxonomy data associated with upper taxonomy data corresponding to the keyword in the case where the upper taxonomy data is registered in the meta-information storing section, wherein it is possible to repeatedly acquire further lower taxonomy data until the lowest taxonomy data is specified;

a procedure for acquiring the leaf meta-data from the lowest taxonomy data; and a procedure for sampling real data corresponding to all of the leaf meta-data from the database and outputting the real data wherein the program further causes the control section to further carry-out procedures for:

recording a conversion table used for converting each of a plurality of additional attributes into an output format;

recording each of the additional attributes in such a manner that the additional attributes are respectively associated with the taxonomy data;

using the control section to determine the output format for the real data from the search request, converting the additional attributes of the leaf meta-data with the control section into the output format using the conversion table and outputting the result, and in the case where there are additional attributes which are not recorded in association with the leaf meta-data which is the object of output, specifying the upper taxonomy data from the leaf meta-data using the meta-information storing section and converting additional attributes which are associated with the upper taxonomy data into the output format.

* * * * *